United States Patent [19]

Yoshida et al.

[11] Patent Number: 5,025,042

[45] Date of Patent: Jun. 18, 1991

[54] FLAME RETARDANT COMPOSITION

[75] Inventors: Mamoru Yoshida, Yokohama; Hachiro Suya, Ayase; Shoji Hayashi, Yokohama; Takao Koshiyama, Sagamihara; Satoshi Hashimoto; Katsuhiro Horita, both of Yokosuka, all of Japan

[73] Assignee: Nippon Unicar Company Limited, Danbury, Conn.

[21] Appl. No.: 382,919

[22] Filed: Jul. 21, 1989

[30] Foreign Application Priority Data

Jul. 29, 1988 [JP] Japan ................................. 63-188179

[51] Int. Cl.$^5$ ........................... C08K 9/00; C08K 3/10; C08L 83/00
[52] U.S. Cl. ..................................... 523/216; 524/436; 525/106
[58] Field of Search .......................................... 523/216

[56] References Cited

U.S. PATENT DOCUMENTS

| 3,832,326 | 8/1974 | North et al. | 260/42.29 |
| 3,922,442 | 11/1975 | North et al. | 428/447 |
| 4,067,847 | 1/1978 | Yui et al. | 260/45.7 |
| 4,732,939 | 3/1988 | Hoshi et al. | 525/106 |

Primary Examiner—Joseph L. Schofer
Assistant Examiner—Wu C. Cheng
Attorney, Agent, or Firm—Saul R. Bresch

[57] ABSTRACT

A composition comprising:
(i) a thermoplastic resin; and
(ii) magnesium hydroxide, the surface of which has been treated with an organic aminosilane.

19 Claims, No Drawings

5,025,042

FLAME RETARDANT COMPOSITION

TECHNICAL FIELD

This invention relates to flame retardant compositions containing thermoplastic resins and a magnesium hydroxide filler. The compositions are particularly useful as insulation for wire and cable.

BACKGROUND ART

Thermoplastic resins, which have good electrical insulation characteristics, are widely used to provide insulating jacketing or sheaths for wire and cable. Recently, there has been a demand for improved flame retardant properties, e.g., as high as V-1 to V-0 using Underwriters Laboratories standards.

Thermoplastic resin can be made flame retardant by adding to the resin organic halides or antimony oxides, for example, or the resin itself can be halogenated such as polyvinyl chloride or chlorinated polyethylene. These thermoplastic resins, however, on burning, sag and emit large amounts of smoke and other harmful gases, and also corrode metals.

In order to solve these problems, it has been proposed to add metal hydroxides to non-halogenated thermoplastic resins. Aluminum hydroxide was first used because of its low cost, but it has such a low decomposition temperature (170° to 190° C.) that the aluminum hydroxide decomposes generating water, which, in turn, causes foaming on interior surfaces. Furthermore, to obtain a flame retardance of V-1 to V-0, aluminum hydroxide has to be added to the thermoplastic resin in large amounts, e.g.. 60 to 65 percent by weight based on the weight of the total composition.

Compared with aluminum hydroxide, magnesium hydroxide has a much higher decomposition temperature (about 360° C.), and, thus, exhibits less foaming. For this reason, and others, magnesium hydroxide has been widely used as a flame retardant in resins. One disadvantage of a thermoplastic resin/magnesium hydroxide flame retardant composition, however, is that when it is applied to an electrical conductor as an outer jacket, the jacket exhibits blushing when it rubs against another jacket or other hard objects, is scratched, or bent.

Blushing or "stress whitening" occurs when a resin, in jacket or molded form, is stressed or impacted and results in a white mark on the surface of the resin at the point of impact. These white marks not only detract from the appearance of the jacket, but also have a degrading effect insofar as arc resistance, insulation, mechanical, and other properties are concerned.

DISCLOSURE OF INVENTION

An object of this invention, therefore, is to provide a composition, which is suitable as an insulating jacket for wire or cable, and, as a jacket, will not be susceptible to blushing.

Other objects and advantages will become apparent hereinafter.

According to the invention, a composition has been discovered which meets the above objective. The composition comprises
 (i) a thermoplastic resin; and
 (ii) magnesium hydroxide, the surface of which has been treated with an organic aminosilane.

DETAILED DESCRIPTION

The thermoplastic resin can be any homopolymer or copolymer produced from two or more comonomers, or a blend of two or more of these polymers, conventionally used as jacketing and/or insulating materials in wire and cable applications. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n butyl acrylate, n-butyl methacrylate, 2-ethylhexyl acrylate, and other alkyl acrylates; diolefins such as 1,4-pentadiene, 1,3-hexadiene, 1,5-hexadiene, 1,4 octadiene, and ethylidene norbornene; other monomers such as styrene, p-methyl styrene, alphamethyl styrene, vinyl naphthalene, and similar aryl olefins; nitriles such as acrylonitrile and methacrylonitrile; vinyl methyl ketone, vinyl methyl ether, and maleic anhydride; and acrylic acid, methacrylic acid, and other similar unsaturated acids. In addition to polyolefins, included among the polymers can be polyesters, polycarbonates, and polyurethanes. The homopolymers and copolymers of ethylene are preferred. The resins are preferably non-halogenated.

Examples of homopolymers and copolymers of ethylene are high pressure, low density polyethylene; polyethylenes of various densities (high, medium, linear low, very low, and ultra-low) wherein the comonomer is 1-butene, 1-hexene, 4-methyl-1-pentene, or 1-octene; ethylene/propylene rubber; ethylene/propylene/diene monomer rubber; ethylene/vinyl acetate copolymer; ethylene/ethyl acrylate copolymer; isobutylene/isoprene rubber; and polybutene-1.

While conventional magnesium hydroxides can be used, a particularly preferred magnesium hydroxide and a method for its preparation are described in U.S. Pat. No. 4,098,762 issued on July 4, 1978. Preferred characteristics for this magnesium hydroxide are (a) a strain in the <101> direction of no more than $3.0 \times 10^{-3}$; (b) a crystallite size in the <101> direction of more than 800 angstroms; and (c) a surface area, determined by the BET method, of less than 20 square meters per gram.

The average particle diameter of the magnesium hydroxide can be in the range of about 0.1 to about 15 microns and is preferably in the range of about 0.5 to about 3 microns. The surface area can be about 1 to about 20 square meters per gram and is preferably about 3 to about 8 square meters per gram. The amount of magnesum hydroxide incorporated into the composition can be in the range of about 50 to about 200 parts by weight based on 100 parts by weight of thermoplastic resin and is preferably present in an amount of about 70 to about 170 parts by weight. The magnesium hydroxide can also have been previously surface treated with various fatty acids or metallic salts of fatty acids such as stearic acid, sodium oleate, sodium stearate, sodium lauryl sulfonate, calcium stearate, or zinc stearate as described, for example, in U.S. Pat. No. 4,255,303.

The aminosilane with which the magnesium hydroxide is surface treated or coated can be any organic compound have an amino group and a silicon atom in its molecular structure. The aminosilane compound may be referred to as a coupling agent. It will generally contain about 6 to about 30 carbon atoms and a trialkoxy moiety, and can be aliphatic or aromatic, or a mixture of various aminosilanes.

Examples of aminosilanes suitable for use in the invention follow:

(1) gamma-aminopropyl triethoxy silane (H₂NCH₂CH₂CH₂Si(OC₂H₅)₃), (2) N-beta-(aminoethyl) gamma-aminopropyl trimethoxy silane (H₂NCH₂CH₂NHCH₂CH₂CH₂Si(OCH₃)₃), (3) gamma ureidopropyl triethoxy silane (H₂NCONHCH₂CH₂CH₂Si(OC₂H₅)₃), (4) gamma-anilinopropyl trimethoxy silane

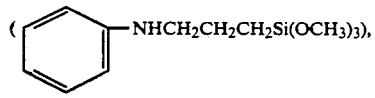

(5) aminobenzene trimethoxy silane

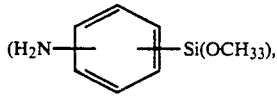

(6) N-4,4'-methylene-bisbenzeneamino-cyclohexanolethyl trimethoxy silane

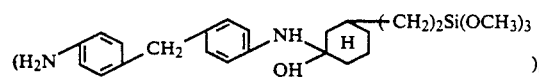

(7) N-4,4'-methylene-bisbenzeneamino-2-hydroxypropyloxypropyl trimethoxy silane

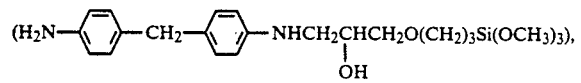

(8) N-4,4'-methylene-bisbenzeneaminopropyl trimethoxy silane hydrochloride

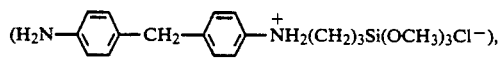

(9) N-aminobenzenemethylene-p-phenylenegammaureidopropyl trimethoxy silane

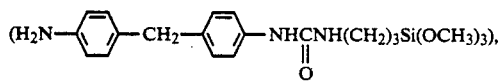

(10) N-4,4'-oxybisbenzeneamino-cyclohexanolethyl trimethoxy silane

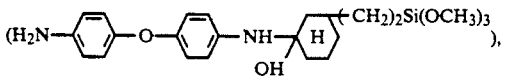

(11) N-4,4'-oxybisbenezeneamino-2-hydroxypropyloxypropyl trimethoxy silane

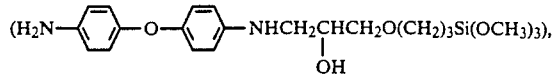

(12) N-4,4'-oxybisbenzeneaminopropyl trimethoxy silane hydrochloride

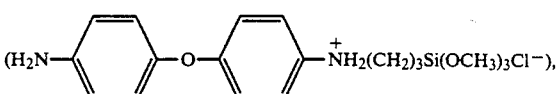

(13) N-aminobenzeneoxy-p-phenylene-gammaureidopropyl trimethoxy silane

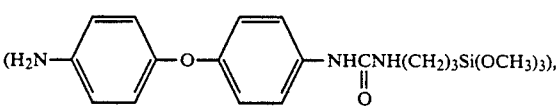

(14) N-4,4'-sulfonylbisbenzeneamino-cyclohexanolethyl trimethoxy silane

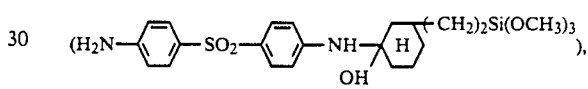

(15) N-4,4'-sulfonylbisbenzeneamino-2-hydroxypropyloxypropyl trimethoxy silane

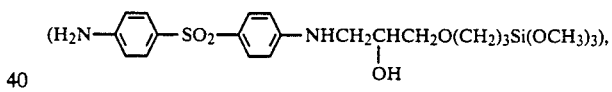

(16) N-4,4'-sulfonylbisbenzeneamino-propyl trimethoxy silane hydrochloride

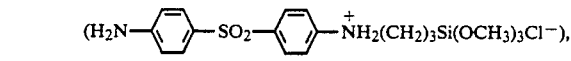

(17) N-aminobenzenesulfonyl-p-phenylenegammaureidopropyl trimethoxy silane

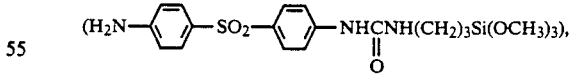

(18) N-p-phenylenediamino-cyclohexanolethyl trimethoxy silane

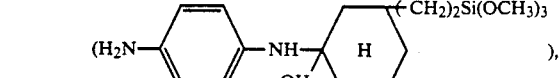

(19) N-p-phenylenediamino-2-hydroxypropyloxypropyl trimethoxy silane

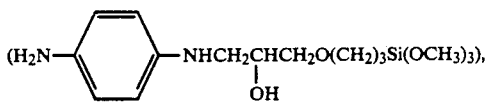

(20) N-p-phenylenediaminopropyl trimethoxy silane hydrochloride

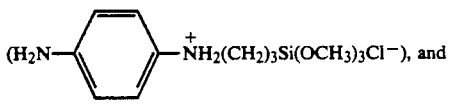

(21) N-p-phenylenediamino-gamma-ureidoppropyl trimethoxy silane

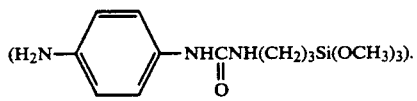

The amount of aminosilane coupling agent used in the surface treatment of the magnesium hydroxide is in the range of about 0.1 to about 3 parts by weight based on 100 parts by weight of resin and is preferably added in the range of about 0.12 to about 2.8 parts by weight.

The surface treatment of the magnesium hydroxide with the aminosilane coupling agent can be carried out in any one of a number of conventional techniques for coating fillers. One technique is a slurry process in which the magnesium hydroxide is introduced into a solution of the aminosilane in ethyl or isopropyl alcohol, and then dried; another technique is by direct application of the aminosilane to a magnesium hydroxide in powder form.

Commercial embodiments of the composition of the invention are generally obtained by kneading together the thermoplastic resin, the magnesium hydroxide surface treated with the aminosilane coupling agent, one or more antioxidants, and other additives in apparatus such as a Banbury mixer, a pressure kneader, a twin screw extruder, a Buss co-kneader, a Henschel mixer, or a roll kneader. The components can be added in any order and the components used in smaller amounts can be added via a masterbatch.

Other useful additives for subject composition are surfactants, reinforcing filler or polymer additives, crosslinking agents, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants.

Examples of antioxidants are: hindered phenols such as tetrakis[methylene(3,5-di-tert-butyl-4 hydroxyhydrocinnamate)]methane and thiodiethylene bis(3,5-di-tert-butyl-4-hydroxy)hydrocinnamate; phosphites and phosphonites such as tris(2,4-di-tert-butylphenyl)-phosphite and di-tert butylphenylphosphonite; various amines such as polymerized 2,2,4-trimethyl-1,2 dihydroguinoline; and silica. Antioxidants are used in amounts of about 1 to about 5 parts by weight per hundred parts by weight of thermoplastic resin.

The thermoplastic resin can be crosslinked by adding a crosslinking agent to the composition or by making the resin hydrolyzable, which is accomplished by adding hydrolyzable groups such as $-Si(OR)_3$ wherein R is a hydrocarbyl radical to the resin structure through copolymerization or grafting.

Suitable crosslinking agents are organic peroxides such as dicumyl peroxide; 2,5-dimethyl-2,5-di(t-butylperoxy)hexane; t-butyl cumyl peroxide; and 2,5-dimethyl-2,5-di(t butylperoxy)hexane-3. Dicumyl peroxide is preferred.

Hydrolyzable groups can be added, for example, by copolymerizing ethylene with an ethylenically unsaturated compound having one or more $-Si(OR)_3$ groups such as vinyltrimethoxysilane, vinyltriethoxysilane, and gammamethacryloxypropyltrimethoxysilane or grafting these silane compounds to the resin in the presence of the aforementioned organic peroxides. The hydrolyzable resins are then crosslinked by moisture in the presence of a silanol condensation catalyst such as dibutyltin dilaurate, dibutyltin diacetate, stannous acetate, lead naphthenate, and zinc caprylate. Dibutyltin dilaurate is preferred.

Examples of hydrolyzable copolymers and hydrolyzable grafted copolymers are ethylene/ vinyltrimethoxy silane copolymer, ethylene/gamma methacryloxypropyltrimethoxy silane copolymer, vinyltrimethoxy silane grafted ethylene/ethyl acrylate copolymer, vinyltrimethoxy silane grafted linear low density ethylene/1-butene copolymer, and vinyltriethoxy silane grafted low density polyethylene.

The composition of the invention can be extruded about, or coated on, an electrical conductor or subjected to injection, rotational, or compression molding.

In addition to being useful in wire and cable applications, subject composition can be used as a sheath for a glass core in fiber optics applications.

The patents mentioned in this specification are incorporated by reference herein.

The invention is illustrated by the following examples.

EXAMPLE 1

Test samples are made up by compression molding the composition into sheets, and cutting up the sheets into sample size.

The composition is prepared as follows: 100 parts by weight of ethylene/ethyl acrylate copolymer (EEA) containing 19 percent by weight ethyl acrylate and having a melt index of 0.75 is prepared.

140 parts by weight magnesium hydroxide, surface treated with stearic acid, are added, in small increments, to 150 parts by weight of ethanol containing 0.07 parts by weight of amino silane number (1) (see above) and 3 parts by weight of water, and agitated to prepare a slurry. The slurry is dried and pulverized. The product is an aminosilane surface treated magnesium hydroxide.

A mixture of 2.5 parts by weight carbon black and 0.5 parts by weight of pentaerythritoltetrakis[3-(3,5-di-t-butyl-4-hydroxyphenyl)-propionate], an antioxidant, is also prepared.

The thermoplastic resin (EEA), the aminosilane coated magnesium hydroxide, and the carbon black/antioxidant mixture are kneaded together at 160° C. for 10 minutes in a Banbury mixer. The mixture is then preheated in a thermopress forming machine for 5 minutes and pressed at 150° C. and 100 kilograms per square centimeter for 3 minutes into a sheet having a thickness of 1 millimeter, a length of 150 millimeters, and a width of 180 millimeters. The sheet is punched into nine 20 millimeter wide, 150 millimeter long, samples for the blushing tests.

The samples are subjected to scratch tests under a load of 500 grams by a needle abrasion testing machine in accordance with MIL Standards, W-22759D. Partial blushing of the impacted portion is observed.

The samples are then bent twice to 180° C. and observed visually. Partial blushing of the impacted portion is observed.

EXAMPLES 2 TO 4

Example 1 is repeated except that aminosilane number (1) is added in amounts of 0.14 (Example 2), 1.4 (Example 3), and 2.8 (Example 4) parts by weight instead of 0.07 parts by weight as in Example 1. No blushing is observed.

EXAMPLE 5

Example 3 is repeated except that an ethylene/1-butene copolymer is used instead of the ethylene/ethyl acrylate copolymer. No blushing is observed.

EXAMPLES 6 TO 13

Example 3 is repeated except that instead of aminosilane number (1), aminosilanes numbered (2), (3), (4), (5), (9), (10), (15), and (21), respectively, are used. No blushing is observed.

EXAMPLES 14 AND 15

For example 14, example 3 is repeated except that no carbon black is used and, for example 15, example 5 is repeated except that 5 parts by weight of carbon black are used. No blushing is observed.

EXAMPLE 16

Example 5 is repeated except that 1 part by weight of gamma-mercaptopropyl trimethoxy silane is added. No blushing is observed.

EXAMPLES 17 TO 20

Example 3 is repeated except that, instead of aminosilane number (1), the following silanes are used:

| Example | Silane |
| --- | --- |
| 17 | vinyl-tris(beta-methoxy ethoxy silane) |
| 18 | gamma-glycidoxypropyl trimethoxy silane |
| 19 | gamma-mercaptopropyl trimethoxy silane |
| 20 | gamma-methacryloxypropyl trimethoxy silane |

Total blushing of the impacted portion is observed.

EXAMPLES 21 TO 24

Examples 17 to 20 are repeated except that an ethylene/1-butene copolymer is used instead of an ethylene/ethyl acrylate copolymer. Total blushing of the impacted portion is observed.

It is also observed that the compositions of examples 2 to 16 display improved strength and moldability over the compositions of examples 1 and 17 to 24.

EXAMPLE 25

Example 3 is repeated except that 0.5 part of dicumyl peroxide is added to the composition. No blushing is observed and the samples show good heat durability and tensile strength.

EXAMPLE 26

Example 3 is repeated except that 10 parts by weight of ethylene/vinyltrimethoxy silane copolymer containing 2 percent by weight silane units is added to the composition. No blushing is observed and the samples show good heat durability and tensile strength.

EXAMPLE 27

Example 26 is repeated except that 0.05 part by weight dibutyltin dilaurate is added. No blushing is observed and the samples show good heat durability and tensile strength.

EXAMPLE 28

Example 26 is repeated except that vinyltrimethoxy silane grafted ethylene/ethyl acrylate copolymer containing 2 percent by weight silane units and 23 percent by weight ethyl acrylate units is substituted for the ethylene/vinyltrimethoxy silane copolymer. No blushing is observed and the samples show good heat durability and tensile strength.

EXAMPLE 29

Example 28 is repeated except that 0.05 part dibutyltin dilaurate is added. No blushing is observed and the samples show good heat durability and tensile strength.

We claim:

1. A composition comprising:
   (i) a thermoplastic resin; and
   (ii) magnesium hydroxide, the surface of which has been treated with an organic aminosilane, said magnesium hydroxide having (a) a strain in the $<101>$ direction of no more than $3.0$ a $10^{-3}$; (b) a crystallite size in the $<101>$ direction of more than 800 angstroms; and (c) a surface area, determined by the BET method, of less than 20 square meters per gram
   wherein the aminosilane is present in an amount of about 0.1 to about 3 parts by weight of aminosilane per 100 parts by weight of resin.

2. The composition defined in claim 1 wherein the resin is not halogenated.

3. The composition defined in claim 1 wherein the resin is an ethylene homopolymer or copolymer.

4. The composition defined in claim 1 wherein the magnesium hydroxide is present in an amount of about 50 to about 200 parts by weight based on 100 parts by weight of resin.

5. The composition defined in claim 1 wherein the magnesium hydroxide has an average particle diameter in the range of about 0.1 to about 15 microns and a surface area in the range of abut 1 to about 20 square meters per gram.

6. The composition defined in wherein the aminosilane is present in an amount of about 0.12 to about 2.8 parts by weight.

7. An electrical conductor coated with the composition defined in claim 1.

8. The composition defined in claim 1 coated on, or extruded about, an electrical conductor.

9. A cable having an outer jacket comprising the composition defined in claim 1.

10. A molded article comprising the composition defined in claim 1.

11. The composition defined in claim 1 additionally containing an organic peroxide crosslinking agent.

12. The composition defined in claim 11 wherein the organic peroxide is dicumyl peroxide.

13. The composition defined in claim 1 wherein the resin is a hydrolyzable resin.

14. The composition defined in claim 13 wherein the resin contains one or more —Si(OR)$_3$ groups wherein R is a hydrocarbyl radical through copolymerization or grafting.

15. The composition defined in claim 14 wherein the silane groups are provided by a vinyltrialkoxy silane.

16. The composition defined in claim 15 wherein the resin is a copolymer of ethylene and vinyl trimethoxy silane.

17. The composition defined in claim 14 wherein the silane compound which is copolymerized or grafted is an alkenyl alkoxy silane.

18. The composition defined in claim 17 additionally containing a silanol condensation catalyst.

19. The composition defined in claim 18 wherein the silanol condensation catalyst is dibutyltin dilaurate.

* * * * *